US008288975B2

(12) United States Patent  (10) Patent No.: US 8,288,975 B2
Mullin et al.  (45) Date of Patent: Oct. 16, 2012

(54) BLDC MOTOR WITH A SIMULATED TAPPED WINDING INTERFACE

(75) Inventors: Paul Steven Mullin, Yellow Springs, OH (US); Stephen J. Dellinger, Houston, OH (US)

(73) Assignee: Regal Beloit EPC Inc., Beloit, WI (US)

( * ) Notice: Subject to any disclaimer, the term of this patent is extended or adjusted under 35 U.S.C. 154(b) by 1136 days.

(21) Appl. No.: 12/019,117

(22) Filed: Jan. 24, 2008

(65) Prior Publication Data

US 2008/0180048 A1  Jul. 31, 2008

Related U.S. Application Data

(60) Provisional application No. 60/886,722, filed on Jan. 26, 2007.

(51) Int. Cl.
 *H02P 1/46* (2006.01)
(52) U.S. Cl. ............... 318/400.01; 318/400.3; 318/751; 62/186; 236/44 C
(58) Field of Classification Search ............ 318/400.09, 318/400.26, 400.3, 751, 801, 805, 807; 62/186; 236/1 B, 44 A, 44 C, 49.3
 See application file for complete search history.

(56) References Cited

U.S. PATENT DOCUMENTS

| | | | |
|---|---|---|---|
| 2,790,125 A | 4/1957 | Ryde | |
| 3,643,143 A | 2/1972 | Rakes | |
| 3,678,358 A * | 7/1972 | Kolatorowicz | 318/400.22 |
| 4,238,717 A | 12/1980 | Knight et al. | |
| 4,528,485 A | 7/1985 | Boyd, Jr. | |
| 4,636,936 A | 1/1987 | Boyd, Jr. et al. | |
| 4,642,536 A | 2/1987 | Boyd, Jr. et al. | |
| 5,068,590 A | 11/1991 | Glennon et al. | |
| 5,123,079 A | 6/1992 | Tanii et al. | |
| 5,461,694 A | 10/1995 | Tanii et al. | |
| 5,592,058 A | 1/1997 | Archer et al. | |
| 5,614,799 A | 3/1997 | Anderson et al. | |
| 5,818,194 A * | 10/1998 | Nordby | 318/701 |
| 5,821,660 A | 10/1998 | Anderson | |
| 6,369,536 B2 | 4/2002 | Beifus et al. | |
| 6,788,022 B2 * | 9/2004 | Sopko et al. | 318/772 |
| 7,102,324 B2 | 9/2006 | Branecky et al. | |
| 7,268,505 B2 | 9/2007 | Pant et al. | |
| 7,327,118 B2 * | 2/2008 | Pant et al. | 318/807 |
| 7,436,138 B2 * | 10/2008 | Beifus | 318/432 |
| 7,766,246 B2 * | 8/2010 | Mulhouse et al. | 236/49.3 |
| 8,013,551 B2 * | 9/2011 | Woodward | 318/400.09 |
| 2001/0028202 A1 | 10/2001 | Chen | |
| 2007/0069683 A1 * | 3/2007 | Pant et al. | 318/807 |
| 2007/0085498 A1 | 4/2007 | Kulkarni et al. | |
| 2007/0205732 A1 * | 9/2007 | Beifus | 318/432 |
| 2007/0209377 A1 | 9/2007 | Beifus et al. | |
| 2010/0033119 A1 * | 2/2010 | Becerra et al. | 318/400.09 |
| 2010/0060228 A1 * | 3/2010 | Woodward | 318/799 |
| 2010/0274395 A1 * | 10/2010 | Durham, III | 700/276 |
| 2011/0010961 A1 * | 1/2011 | Wehrheim et al. | 34/549 |

* cited by examiner

*Primary Examiner* — Eduardo Colon Santana
(74) *Attorney, Agent, or Firm* — Michael Best & Friedrich LLP

(57) ABSTRACT

A brushless direct current (BLDC) motor having a simulated tapped-winding input. The BLDC motor includes a stator/rotor assembly having a stator and a rotor. The BLDC motor has a common input and a plurality of power inputs. Each power input corresponds to an operating parameter. The BLDC motor receives an AC voltage across the common input and one of the power inputs and operates the stator/rotor assembly according to an operating parameter corresponding to the power input receiving power.

12 Claims, 6 Drawing Sheets

BLDC MOTOR WITH A SIMULATED TAPPED WINDING INTERFACE

RELATED APPLICATION

The present application claims the benefit of prior filed U.S. Provisional Patent Application No. 60/886,722, filed on Jan. 26, 2007, the entire content of which is hereby incorporated by reference.

BACKGROUND

Brushless direct current (BLDC) motors are becoming more prevalent in industries that typically did not use BLDC motors. For example, the need for increased efficiency in the heating, ventilating, and air conditioning market has led to the use of BLDC motors for powering the blower. BLDC motors can include a rotor having a plurality of magnetic poles (e.g., a plurality of poles produced with permanent magnets) of alternating polarity disposed on a surface of a rotor core, and a stator that receives electrical power and produces a magnetic field in response thereto. The magnetic field of the stator interacts with a magnetic field of the rotor to cause movement of the rotor.

Standard operating conditions for heating, ventilating, and/or air conditioning systems (collectively referred to herein as HVAC systems) generally vary over relatively short periods of time. It is typically preferred to adjust the cooling and heating cycles, among other parameters, of the HVAC systems as conditions vary. For example, some thermostats are configured to generate a signal indicative of a cooling requirement. In response to the signal generated by the thermostat, the motor of the HVAC system operates a fan or a blower.

Conventional HVAC applications often utilize multi-tapped permanent split capacitor (PSC) type motors. In general, a multi-tapped PSC motor is a motor that has a multi-tapped main winding where all or part of the main winding is coupled in parallel with an auxiliary starting winding that is coupled in series with a capacitor. Such multi-tapped PSC motors are used in HVAC applications, such as furnace blower and air handler applications, because the multi-tapped winding can produce variable output torque and, therefore, variable output speed for the purpose of delivering different amounts of air flow for different applications. For example, one tap setting may provide a relatively low amount of air flow for air circulation when there is no heating or cooling activity. Another tap setting could increase the air flow when cooling is desired. By using multiple taps, various operating states can be established for a tapped PSC motor, such as heating, cooling, and air. In general, each tap point on the multi-tapped PSC motor is coupled to an input line and relays are energized in response to control signals from, for example, a thermostat to energize one of the tap points at any given time.

Blower motors used in residential HVAC systems traditionally use PSC motors. These motors generally have two independent power connections to accommodate heating or cooling modes of operation. The heating or cooling power inputs are normally connected to different winding taps in the PSC motor to provide somewhat different operating speeds for the blower in the respective modes of operation. More than two sets of taps can be designed into the PSC motor, allowing the OEM or installer to select the operating speed by appropriate connection of the taps to the respective heating and cooling power connections. The energizing of these AC power connections to the motor is controlled by activation of a temperature switch and a relay driven from the thermostat.

SUMMARY

The invention in at least one embodiment relates to a BLDC motor for use in an air movement system. Specifically, the BLDC motor can be a direct replacement for a multi-tapped induction motor used in an HVAC system and is designed to be connected to the standard power terminals of an HVAC system expecting a multi-tapped induction motor. The BLDC motor can also be used in other apparatus/systems expecting a multi-tapped induction motor.

In one embodiment, the invention provides a BLDC motor including a stator/rotor assembly having a stator and a rotor, a common input, and a plurality of power inputs, each power input corresponding to an operating parameter. The BLDC motor is configured to receive an AC voltage across the common input and one of the power inputs and to operate the stator/rotor assembly at an operating parameter corresponding to the power input receiving power.

In another embodiment the invention provides a method of operating a BLDC motor having a stator/rotor assembly, a common input, and a plurality of power inputs. The method includes applying AC power across the common input and one of the power inputs, converting the AC power to DC power, selecting an operating parameter corresponding to the power input power is applied to, and driving the stator/rotor assembly according to the selected parameter.

In another embodiment the invention provides an HVAC system including a thermostat, a BLDC motor, and a system controller. The BLDC motor includes a common input and a plurality of power inputs. The system controller is coupled to the thermostat and the BLDC motor and applies power across the common input and one of the power inputs as directed by the thermostat.

In another embodiment the invention provides a brushless direct current motor. The motor includes a stator having windings, a rotor having a plurality of magnets, and a drive circuit. The stator is configured to generate a plurality of magnetic fields, and the rotor is rotatable by the plurality of magnetic fields. The drive circuit has a plurality of power inputs, a common input, an input interface, a controller, and an inverter, and drives the windings. The input interface is coupled to the plurality of power inputs and the common input, and is configured to receive an alternating current voltage across one of the plurality of power inputs and the common input. The controller is configured to receive an indication, from the input interface, the indication identifying which of the plurality of power inputs the alternating current voltage is applied to. The inverter is controlled by the controller, configured to power the windings, and dictates how the brushless direct current motor operates.

In another embodiment the invention provides a method of operating a permanent magnet, brushless direct current motor. The motor includes a plurality of power inputs, a common input, a rectifier, an inverter, a controller, a stator, and a rotor. The method comprises receiving an alternating current voltage across one of the plurality of power inputs and the common input, rectifying the alternating current voltage, powering the inverter with the rectified voltage, providing the controller with an indication of which of the plurality of power inputs is receiving the alternating current voltage, and driving the inverter based on the indication, the inverter driving the stator to rotate the rotor.

In another embodiment the invention provides a heating, ventilating, and/or air conditioning system. The system includes an air mover and a permanent magnet, brushless direct current motor having a plurality of power inputs and a common input, and a controller. The permanent magnet, brushless direct current motor is configured to drive the air mover. The controller is configured to provide an alternating current voltage across one of the plurality of power inputs and the common input of the motor. The permanent magnet, brushless direct current motor operates the air mover at an operating parameter based on which of the plurality of power inputs receives the alternating current voltage.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Figure 1:
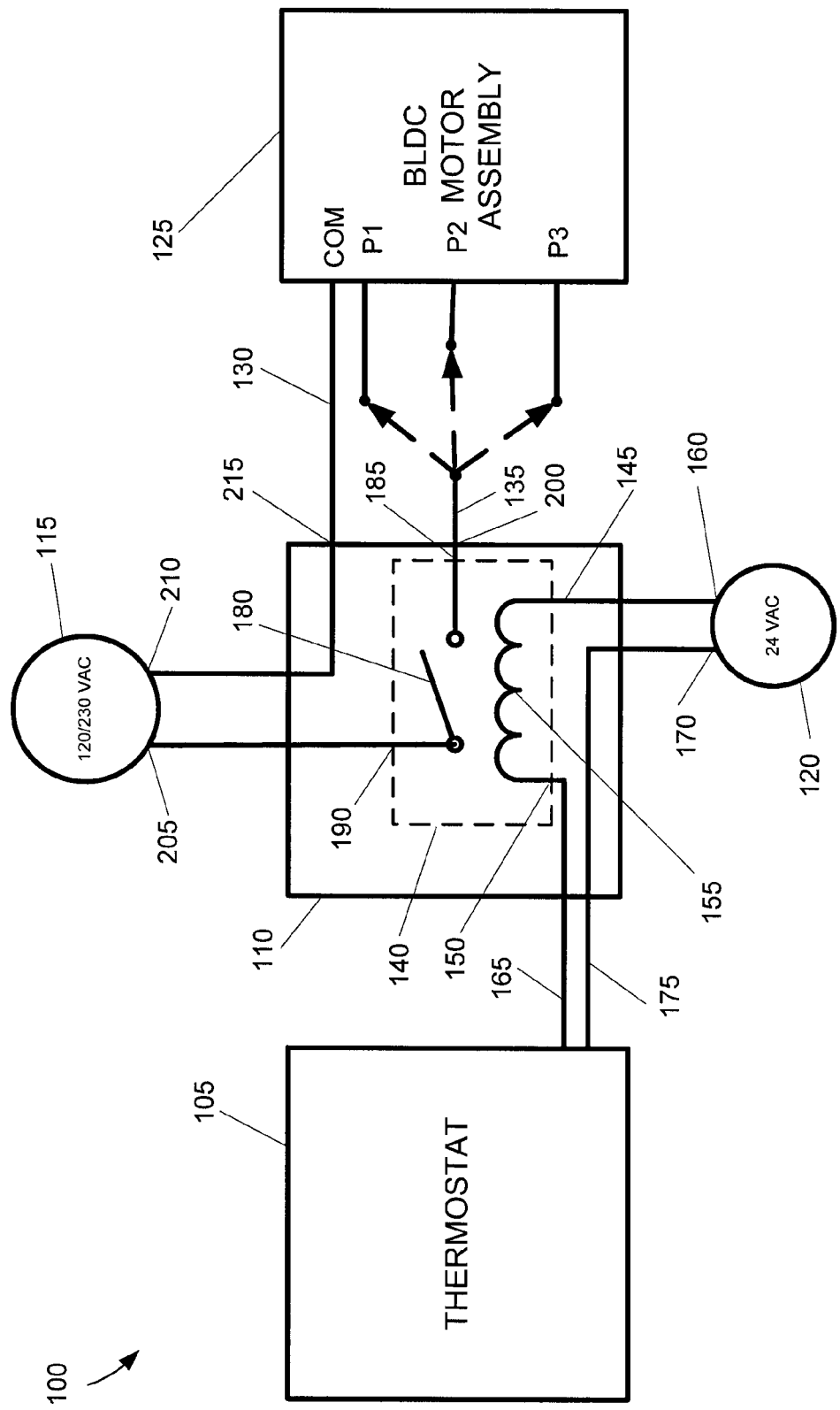
FIG. 1 is a schematic illustration of a first HVAC system including a thermostat, system controller, and motor assembly.

FIG. 1 illustrates a first HVAC system 100. The system 100 includes a thermostat 105, a system controller 110, a high-voltage power source 115, a low-voltage power source 120, and a brushless direct-current (BLDC) motor 125 with a simulated tapped-winding interface. The system controller 110 is coupled to the BLDC motor 125 via a common connection 130 and a power connection 135. The BLDC motor 125 includes four inputs, a common input (COM) and first, second, and third power inputs (P1, P2, and P3 respectively). Applying power (e.g., 120/240 VAC) across the common input and one of the first, second, or third power inputs (P1, P2, or P3) causes the BLDC motor 125 to operate as described below. Each of the power inputs (P1, P2, and P3) can correspond to different motor operating parameters (e.g., different speeds or torques). In an exemplary construction of the BLDC motor 125, applying power between the first power input P1 and the common input COM operates the BLDC motor 125 at 850 RPM, applying power between the second power input P2 and the common input COM operates the BLDC motor 125 at 1000 RPM, and applying power between the third power input P3 and the common input COM operates the BLDC motor 125 at 1150 RPM.

In the construction shown, the HVAC system 100 can operate at a single speed. A technician installing the HVAC system 100 can determine an air flow of the HVAC system 100 for a particular installation (e.g., based on a system size and/or ducting) for each power input P1, P2, and P3 and can connect the power input P1, P2, or P3 providing the optimum air flow for the system 100. The power inputs P1, P2, and P3 can be terminal inputs, a wiring cable, or other suitable connection scheme.

The system controller 110 includes, among other things, a normally-open relay 140. The normally-open relay 140 includes a first terminal 145 and a second terminal 150. The first and second terminals 145 and 150 are coupled to a coil 155 in the normally-open relay 140. The first terminal 145 is also coupled to a first output 160 of the low-voltage power source 120. The second terminal 150 is also coupled to the thermostat 105 via line 165. A second output 170 of the low-voltage power source 120 is coupled, through the system controller 110, to the thermostat 105 via line 175. The normally-open relay 140 also includes a switch 180 coupled to a first switch terminal 185 and a second switch terminal 190. The first switch terminal 185 is also coupled to line 135 via a terminal 200. The second switch terminal 190 is coupled to a first output 205 of the high-voltage power source 115. A second output 210 of the high-voltage power source 115 is coupled, through the system controller 110, to line 130 via a terminal 215.

During operation, when the thermostat 105 determines that the BLDC motor 125 should run, the thermostat 105 internally couples line 165 to line 175. This applies low-voltage power across the first and second terminals 145 and 150 of the normally-open relay 140. The powered coil 155 causes the switch 180 to close, applying high-voltage power across the common COM and the input power line P1, P2, or P3 that is wired in the system 100. The voltage across the common input COM and the wired power input P1, P2, or P3 causes the BLDC motor 125 to run according to a parameter (e.g., a speed) associated with the input power line P1, P2, or P3 receiving power.

When the thermostat 105 determines that the BLDC motor 125 should not run, the thermostat 105 breaks the connection between lines 165 and 175 removing power from the coil 155. Once power is removed from the coil 155, the switch 180 opens and power is removed from the BLDC motor 125, stopping the BLDC motor 125.

Figure 2:
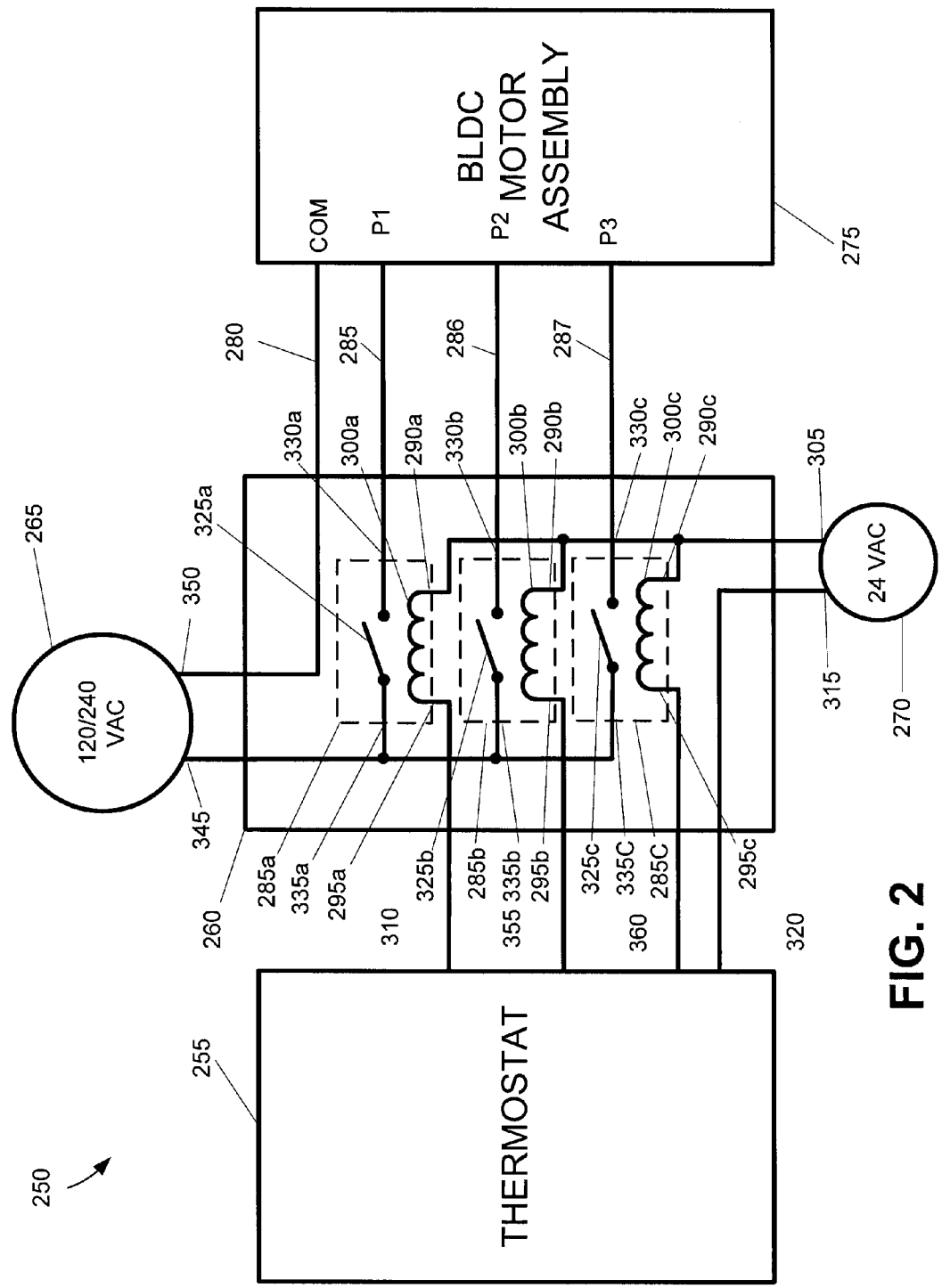
FIG. 2 is a schematic illustration of a second HVAC system including a thermostat, system controller, and motor assembly.

FIG. 2 illustrates a second HVAC system 250. The system 250 includes a thermostat 255, a system controller 260, a high-voltage power source 265, a low-voltage power source 270, and a brushless direct-current (BLDC) motor 275 having a simulated tapped-winding interface.

In the construction shown, the BLDC motor 275 operates at a plurality of speeds, or other operating parameters (e.g., torque, current, cubic-feet-per-minute), under the control of the thermostat 255. The system controller 260 is coupled to the BLDC motor 275 via a common connection 280 and a plurality of power connections 285, 286, and 287. The BLDC motor 275 includes four inputs, a common input COM and first, second, and third power inputs P1, P2, and P3, respectively. Applying power (e.g., 120/240 VAC) across the common input COM and one of the first, second, or third power inputs P1, P2, or P3 causes the BLDC motor 275 to operate as described below.

Each of the power inputs P1, P2, and P3 can correspond to a different motor operating parameter (e.g., speed or torque). In an exemplary construction of the BLDC motor 275, applying power between the first power input P1 and the common input COM operates the BLDC motor 275 at 1150 RPM, applying power between the second power input P2 and the common input COM operates the BLDC motor 275 at 1000 RPM, and applying power between the third power input P3 and the common input COM operates the BLDC motor 275 at 850 RPM. The power inputs P1, P2, and P3 can be terminal inputs, a wiring cable, or other suitable connection scheme.

The system controller 260 includes, among other things, a first normally-open relay 285a, a second normally-open relay 285b, and a third normally-open relay 285c. The first normally-open relay 285a includes a first terminal 290a and a second terminal 295a. The first and second terminals 290a and 295a are coupled to a coil 300a in the first normally-open relay 285a. The first terminal 290a is also coupled to a first output 305 of the low-voltage power source 270. The second terminal 295a is also coupled to the thermostat 255 via line 310. A second output 315 of the low-voltage power source 270 is coupled, through the system controller 260, to the thermostat 255 via line 320. The first normally-open relay 285a also includes a switch 325a coupled to a first switch terminal 330a and a second switch terminal 335a. The first switch terminal 330a is coupled to a line 285. The second switch terminal 335a is coupled to a first output 345 of the high-voltage power source 265. A second output 350 of the high-voltage power source 265 is coupled, through the system controller 260, to line 280.

The second normally-open relay 285b includes a first terminal 290b and a second terminal 295b. The first and second terminals 290b and 295b are coupled to a coil 300b in the second normally-open relay 285b. The first terminal 290b is also coupled to the first output 305 of the low-voltage power source 270. The second terminal 295b is also coupled to the thermostat 255 via line 355. The second normally-open relay 285b also includes a switch 325b coupled to a first switch terminal 330b and a second switch terminal 335b. The first switch terminal 330b is coupled to a line 286. The second switch terminal 335b is coupled to the first output 345 of the high-voltage power source 265.

The third normally-open relay 285c includes a first terminal 290c and a second terminal 295c. The first and second terminals 290c and 295c are coupled to a coil 300c in the third normally-open relay 285c. The first terminal 290c is also coupled to the first output 305 of the low-voltage power source 270. The second terminal 295c is also coupled to the thermostat 255 via line 360. The third normally-open relay 285c also includes a switch 325c coupled to a first switch terminal 330c and a second switch terminal 335c. The first switch terminal 330c is coupled to a line 287. The second switch terminal 335c is coupled to the first output 345 of the high-voltage power source 265.

During operation, the thermostat 255 determines at what speed the BLDC motor 275 should run. For example, the thermostat 255 can run the BLDC motor 275 in a heating mode having a high (first) speed and a low (second) speed, and in a cooling mode using a third speed. When the thermostat 255 determines that the BLDC motor 275 should operate at the high speed (e.g., 1150 RPM) for the heating mode, the thermostat 255 internally couples line 310 to line 320. This applies low-voltage power across the first and second terminals 290a and 295a of the first normally-open relay 285a. The powered coil 300a causes the switch 325a to close applying high-voltage power across the common COM and the first input power line P1. The voltage across the common input COM and the first power input line P1 causes the BLDC motor 275 to run according to the parameter associated with the first input power line P1 (e.g., 1150 RPM).

When the thermostat 255 determines that the BLDC motor 275 should operate at a low speed (e.g., 1000 RPM) for the heating mode, the thermostat 255 internally couples line 355 to line 320. This applies low-voltage power across the first and second terminals 290b and 295b of the second normally-open relay 285b. The powered coil 300b causes the switch 325b to close applying high-voltage power across the common COM and the second input power line P2. The voltage across the common input COM and the second power input line P2 causes the BLDC motor 275 to run according to the parameter associated with the second input power line P2 (e.g., 1000 RPM).

When the thermostat 255 determines that the BLDC motor 275 should operate at a speed (e.g., 850 RPM) for the cooling mode, the thermostat 255 internally couples line 360 to line 320. This applies low-voltage power across the first and second terminals 290c and 295c of the third normally-open relay 285c. The powered coil 300c causes the switch 325c to close applying high-voltage power across the common COM and the second input power line P3. The voltage across the common input COM and the third power input line P3 causes the BLDC motor 275 to run according to the parameter associated with the third input power line P3 (e.g., 850 RPM).

When the thermostat 255 determines that the BLDC motor 275 should not run, the thermostat 255 breaks the connection between line 320 and lines 310, 355, and 360 removing power from the coils 300a, 300b, and 300c. Once power is removed from the coils 300a, 300b, and 300c, the switches 320a, 320b, and 320c open and power is removed from the BLDC motor 275 stopping the BLDC motor 275.

Figure 3:
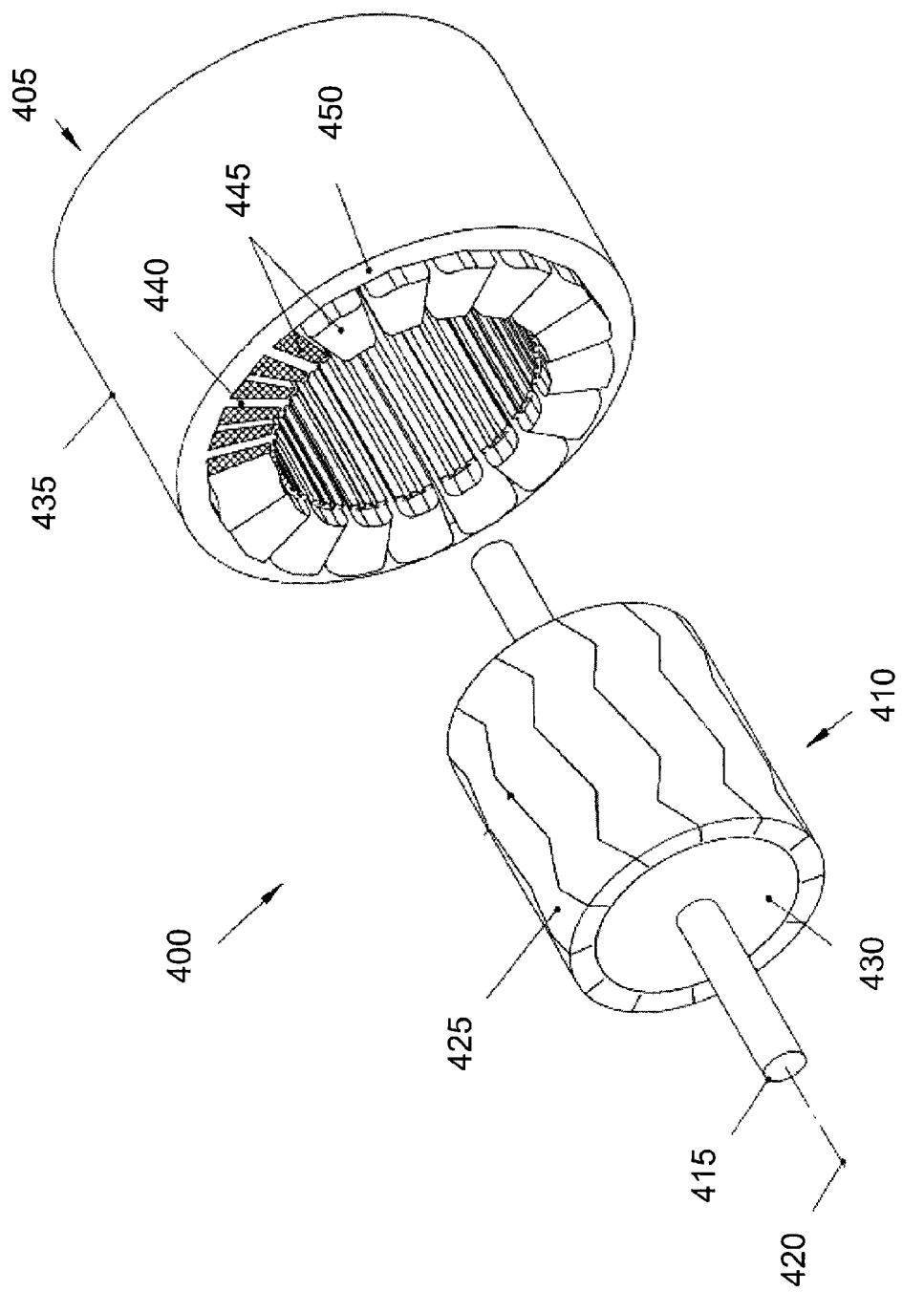
FIG. 3 is an exploded view of a stator/rotor assembly.

FIG. 3 illustrates a stator/rotor assembly 400 according to one construction of the BLDC motor schematically shown in FIGS. 1 and 2. The stator/rotor assembly 400 includes a stator 405 and a rotor 410 mounted onto a shaft 415. The rotor 410 and the shaft 415 rotate about a rotational axis 420. In general, the stator 405 receives electrical power, and produces a magnetic field in response thereto. The magnetic field of the stator 405 interacts with a magnetic field of the rotor 410 to produce mechanical power on the shaft 415.

The rotor 410 can include a plurality of magnetic poles 425 of alternating polarity placed on the surface of a rotor core 430. The rotor core 430 can include laminations (e.g., magnetic steel laminations), and/or solid material (e.g., a solid magnetic steel core), and/or compressed powdered material (e.g., compressed powder of magnetic steel). In one construction of the stator/rotor assembly 400, the rotor 410 can include a sheet of permanent magnet (e.g., hard magnetic) material disposed on the rotor core 430. In another construction of the stator/rotor assembly 400, the rotor 410 can include a plurality of strips of permanent magnet material attached (e.g., with adhesive) around the rotor core 430. The magnet material can be magnetized by a magnetizer (not shown) to provide a plurality of alternating magnetic poles. Additionally, the number of magnetic strips can be different than the number of rotor magnetic poles. Yet in another construction of the stator/rotor assembly 400, the rotor 410 can include blocks of permanent magnet material placed substantially within the rotor core 430.

It is to be understood that the description of the stator/rotor assembly 400 in FIG. 3 is not limited to a particular mechanical construction, geometry, or position of the rotor 410 and stator 405. For example, FIG. 3 illustrates the rotor 410 operable to be located substantially within the stator 405 and is separated by a radial air gap from the stator 405. In other constructions of the stator/rotor assembly 400, the rotor 410 can be radially aligned and positioned to the exterior of the stator 405 (i.e., the machine is an external- or outer-rotor machine.) Other constructions can include a motor assembly not explicitly described herein, such as an induction motor.

The stator 405 illustrated in FIG. 3 includes a stator core 435 having a plurality of stator teeth 440, stator windings 445, and a back iron portion 450. In some constructions, the stator core 435 can include a stack of magnetic steel laminations or sheets. In other constructions, the stator core 435 can be formed from a solid block of magnetic material, such as compacted powder of magnetic steel. The stator windings 445 can include electrical conductors placed in the slots and around the plurality of teeth 440. In other constructions of the stator 405, the stator core 435 and stator windings 445 can define configurations not defined herein, however such configurations are not limiting to the scope of the invention.

In some operations of the BLDC motor assembly of FIGS. 1 and 2, electrical current flows through the stator windings 445, producing a magnetic field that interacts with the magnetic field of the rotor 410, thus generating a torque to the rotor 410 and shaft 415. The electrical current can have various types of waveforms (e.g., square wave, quasi-sine wave, etc). The stator windings 445 receive electrical current from an electrical drive circuit, such as the drive circuit illustrated in FIG. 4.

Figure 4:
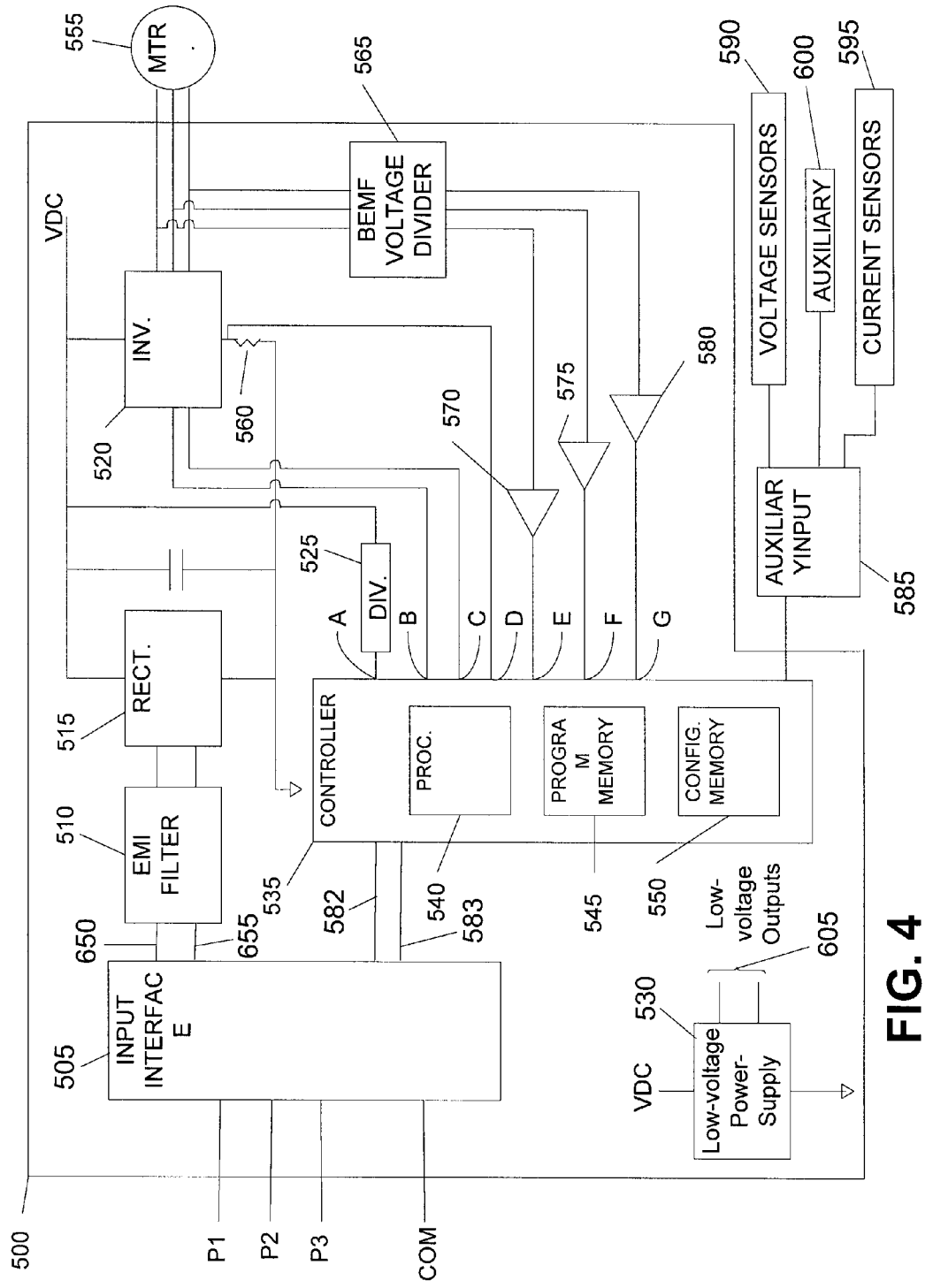
FIG. 4 is a schematic illustration of a drive circuit for a BLDC motor.

FIG. 4 illustrates a drive circuit 500 of the BLDC motor that receives power from a power source and drives the stator/rotor assembly 400 in response to an input. More particularly, the drive circuit 500 can receive high-voltage AC power (e.g., 120/240 VAC) at an input interface 505 via a common input COM and one of a plurality of power inputs P1, P2, or P3. The construction shown includes three power inputs; however, other constructions can include other quantities of power inputs. The input interface 505 provides AC power to a filter 510 and a rectifier 515 that filters and rectifies the AC power, resulting in a direct-current bus voltage VDC. The bus voltage VDC is provided to an inverter 520, a voltage divider 525, and a low-voltage power-supply 530. The voltage divider 525 reduces the bus voltage to a value capable of being acquired by a controller 535 at a terminal A. The controller 535 includes a processor 540, a program memory 545, and a configuration memory 550. The processor 540, program memory 545, and configuration memory 550 can reside on a single electronic component or one or more of the processor 540, program memory 545, and configuration memory 550 can be separate components. Generally, the processor 540 reads, interprets, and executes instructions stored in the program memory 545 to control the drive circuit 500, while the configuration memory 550 is designated to store characterization data and operating parameters related to the BLDC motor and the HVAC system. The controller 535, which can be in the form of a microcontroller, can include other components such as a power supply, an analog-to-digital converter, and filters. The controller 535 issues drive signals at terminals B and C to control the inverter 520. The inverter 520 can include power electronic switches (e.g., MOSFETs, IGBTs) to vary the flow of current to the stator/rotor assembly 400 of the BLDC motor. In some constructions of the drive circuit 500, the inverter 520 can be in the form of a bridge circuit. A resistor 560 can be used as a sensor to generate a voltage having a relation to the bus current of the inverter 520. The voltage at the resistor 560 is provided to the controller 535 at terminal D. The drive circuit 500 can also include other current sensors to sense bus current. It is envisioned that the controller 535 can receive signals indicative of phase currents and phase voltages provided by the inverter 520.

The drive circuit 500 can also include a back electromagnetic force (BEMF) voltage divider 565 coupled to a first variable gain amplifier 570, a second variable gain amplifier 575, and a third variable gain amplifier 580. The BEMF voltage divider 565 and variable gain amplifiers 570, 575, 580 provide voltage values to the controller 535 at terminals E, F, and G. The voltage values provided to the controller 535 by each variable gain amplifier 570, 575, and 580 can have a relation to the BEMF of each phase voltage, respectively.

During operation of the HVAC system, the drive circuit 500 can control the stator/rotor assembly 400 by providing drive signals to the inverter 520 based on inputs received at the controller 535. The controller 535 can receive input signals from the input interface 505 (via lines 582 or 583), an auxiliary input 585, the bus voltage channel, the bus current channel, and the BEMF voltage channels. The auxiliary input interface 505 can be configured to receive input signals from one or more voltage sensors 590, current sensors 595, and auxiliary systems 600. Voltage sensors 590 and current sensors 595 can be used to measure voltages and currents, respectively, in the stator/rotor assembly 400 or other devices operating in cooperation with the stator/rotor assembly 400. Thus, the voltage sensors 590 and current sensors 595 can be coupled or placed within a housing of the stator/rotor assembly 400, or alternatively, the sensors 590 and 595 can be placed at a remote location. Moreover, the drive circuit 500 can be coupled or placed within a housing of the stator/rotor assembly 400, or alternatively in close proximity to the stator/rotor assembly 400. Signals generated by auxiliary inputs 600 can be received at the auxiliary input interface 505 and can include signals from safety systems or other input/output devices.

The input interface 505 receives high-voltage AC power (e.g., 120/240 VAC) across the common input COM and one of the plurality of power inputs P1, P2, or P3. As discussed above, the input interface 505 provides the high-voltage AC power to the EMI filter 510 and rectifier 515, which generate the DC bus voltage VDC. The DC bus voltage VDC is also applied to the low-voltage power supply 530, which generates low-voltage DC power (e.g., 5 VDC, 12 VDC) on one or more low-voltage outputs 605. The low-voltage outputs 605 provide power to the various components (e.g., the controller 535) of the drive circuit 500.

When high-voltage AC power is applied to the input interface 505, the controller 535 receives power from the low-voltage power supply 530, is powered-up, and executes a program saved in the program memory 545. Executing the program causes the controller 535 to operate the stator/rotor assembly 400. If power is applied to the input interface 505 between the first input power line P1 and the common input COM, the input interface 505 provides no signal to the controller 535 via lines 582 and 583. If power is applied to the input interface 505 between the second input power line P2 and the common input COM, the input interface 505 provides a square-wave signal to the controller 535 via line 582. If power is applied to the input interface 505 between the third input power line P3 and the common input COM, the input interface 505 provides a square-wave signal to the controller 535 via line 583. In other constructions, the input interface can provide signals other than a square-wave to the controller 535 (e.g., a 0-10 VDC signal or a digital signal). The controller 535, based on the signals received or not received on lines 582 and 583 selects a stored operating parameter at which to operate the motor. For example, when power is applied between the common input COM and the first power input P1, the input interface 505 provides no signals on lines 582 and 583 and the controller 535 operates the motor based on a first operating parameter (e.g., 1150 RPM). When power is applied between the common input COM and the second power input P2, the input interface 505 provides a signal on line 582 and no signal on line 583 and the controller operates the motor based on a second operating parameter (e.g., 1000 RPM). And when power is applied between the common input COM and the third power input P3, the input interface 505 provides a signal on line 583 and no signal on line 582 and the controller operates the motor based on a third operating parameter (e.g., 850 RPM).

Figure 5:
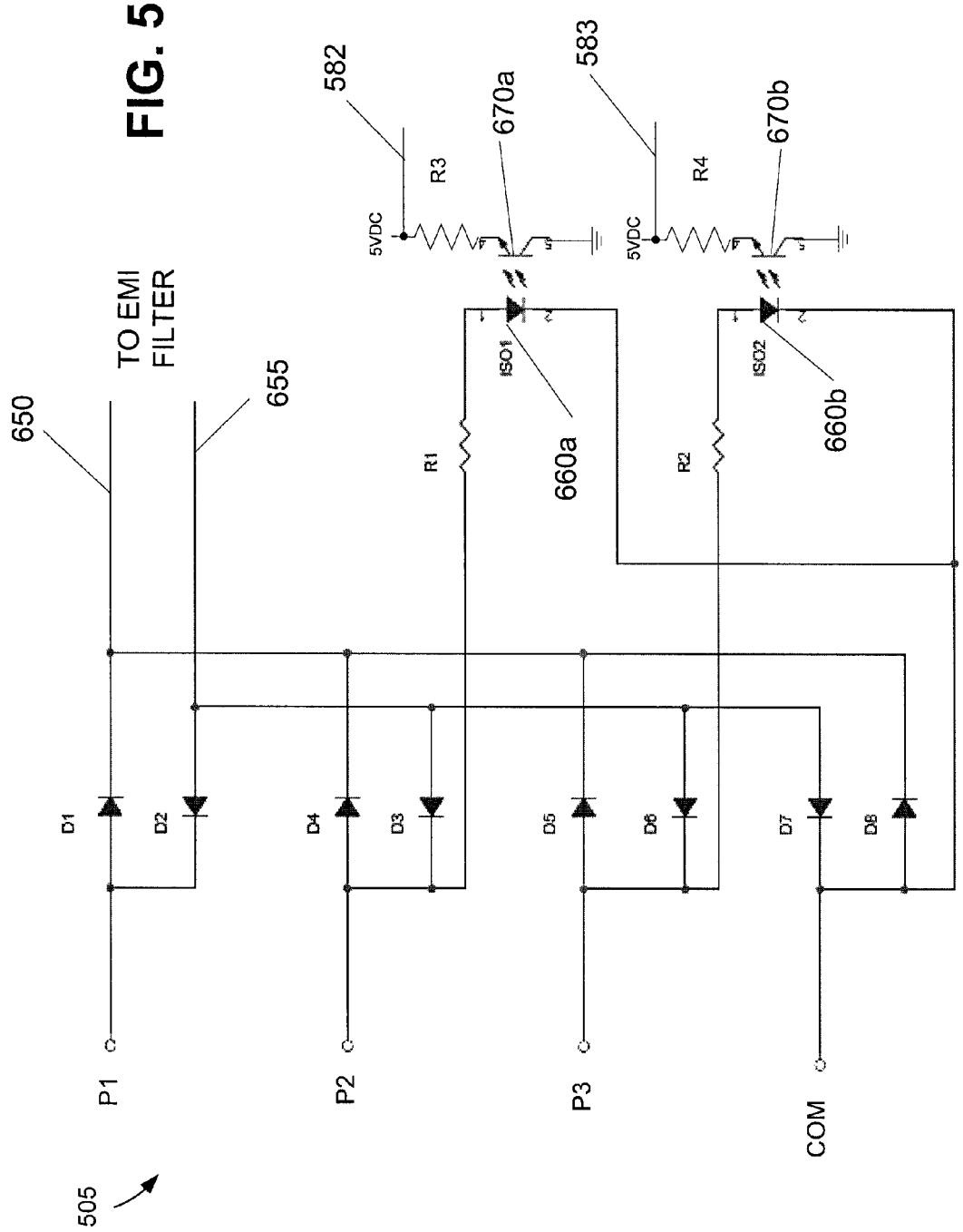
FIG. 5 is a schematic illustration of an input interface for a BLDC motor simulating a tapped-winding.

FIG. 5 is a construction of the input interface 505. The input interface 505 includes three power input lines P1, P2, and P3; a common input line COM; diodes D1-D8; resistors R1-R4; and opto-isolators ISO1 and ISO2. When power is applied across the common input COM and the first power input P1, diodes D1, D2, D7, and D8 form a bridge rectifier generating a DC voltage across lines 650 and 655, which are coupled to the EMI filter 510 (as shown in FIG. 4). When power is applied across the common input COM and the first power input P1, diodes D3, D4, D7, and D8 form a bridge rectifier also generating a DC voltage across lines 650 and 655. When power is applied across the common input COM and the first power input P1, diodes D5, D6, D7, and D8 form a bridge rectifier also generating a DC voltage across lines 650 and 655.

Opto-isolators ISO1 and ISO2 include an optical transmitter such as a light-emitting-diodes (LEDs) 660a or 660b. The LEDs 660a and 660b are optically coupled to receivers such as phototransistors 670a and 670b. When a voltage having a positive polarity is applied across the LEDs 660a and 660b, the LEDs 660a and 660b light triggering the phototransistors 670a and 670b. When the phototransistors 670a and 670b are triggered, the phototransistors 670a and 670b act as electric shorts. When no voltage or a voltage having a negative polarity is applied across the LEDs 660a and 660b, the LEDs 660a and 660b remain dark and the phototransistors 670a and 670b are not triggered and act as electrical opens.

When AC power is applied across the common input COM and the second power input P2, the AC signal is also present across ISO1. During the positive half-cycle of the AC signal, LED 660a lights, triggering phototransistor 670a and causing phototransistor 670a to short, coupling common to line 582 and the controller 535. During the negative half-cycle of the AC signal, the LED 660a is dark and phototransistor 670a is not triggered. Phototransistor 670a thus acts as an electrical open and line 582 is pulled up to approximately 5 VDC through pull-up resistor R3. Therefore, when AC power is applied across the common input COM and the second power input P2, a square-wave signal is present on line 582 and at the controller 535.

When AC power is applied across the common input COM and the third power input P3, the AC signal is also present across ISO2. During the positive half-cycle of the AC signal, LED 660b lights, triggering phototransistor 670b and causing phototransistor 670b to short, coupling common to line 583 and the controller 535. During the negative half-cycle of the AC signal, the LED 660b is dark and phototransistor 670b is not triggered. Phototransistor 670b thus acts as an electrical open and line 583 is pulled up to approximately 5 VDC through pull-up resistor R4. Therefore, when AC power is applied across the common input COM and the third power input P3, a square-wave signal is present on line 583 and at the controller 535.

Figure 6:
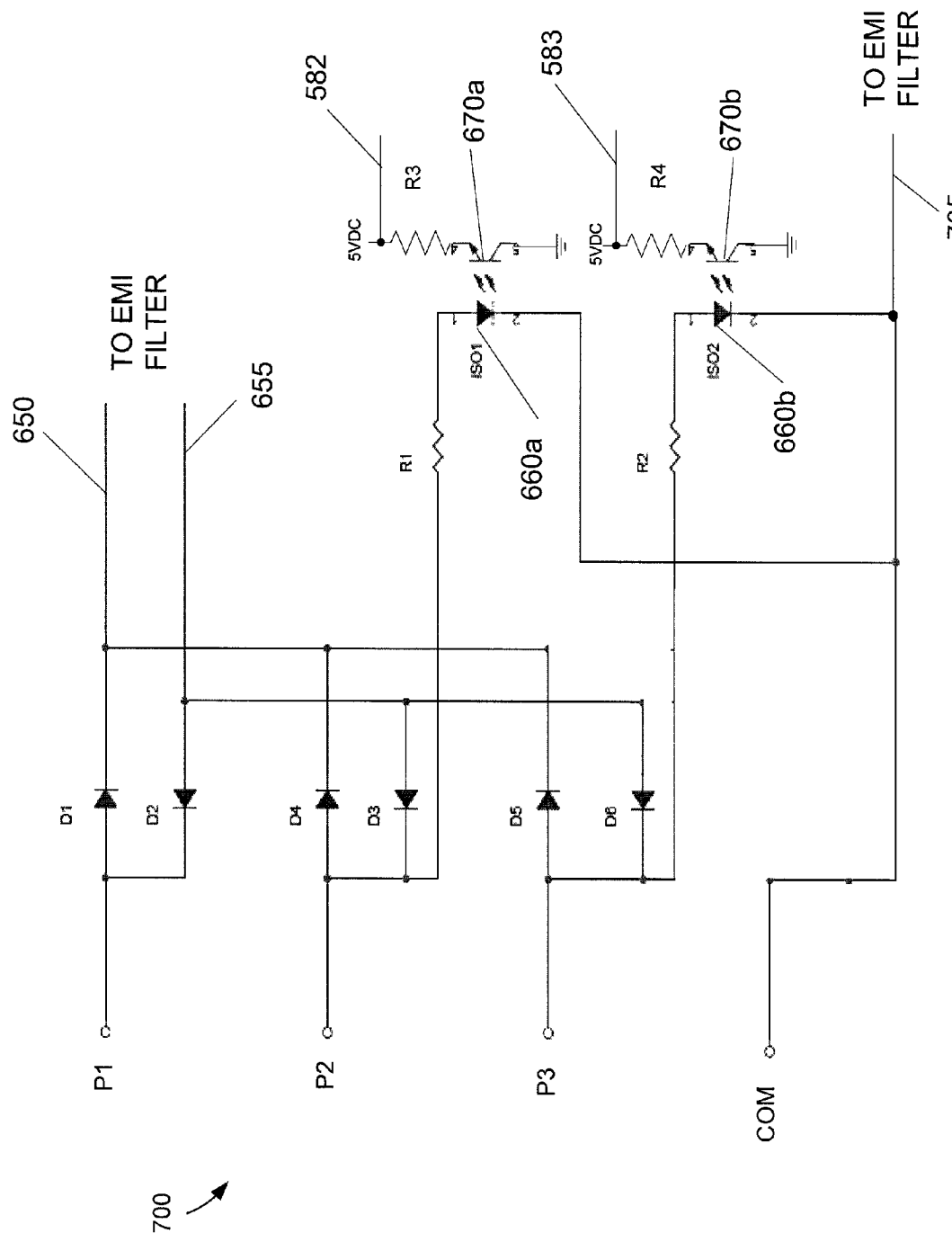
FIG. 6 is a schematic illustration of a second construction of an input interface for a BLDC motor simulating a tapped-winding.

FIG. 6 is an illustration of an alternative construction of an input interface 700. The input interface 700 includes three power input lines P1, P2, and P3; a common input line COM; diodes D1-D6; resistors R1-R4; and opto-isolators ISO1 and ISO2 similar to the input interface 505 shown in FIG. 5. However, input interface 700 couples the common input line COM directly to the EMI Filter 510 (as shown in FIG. 4). In addition, lines 650 and 655 provide half-wave rectified signals to the EMI filter 510 instead of providing a full-wave rectified signal (i.e., DC) to the EMI filter 510 as they do in input interface 505. The EMI filter 510 uses the half-wave rectified signals on lines 650 and 655 along with the common input COM to generate a DC voltage. In other constructions, the EMI filter 510 can filter the half-wave rectified signals on lines 650 and 655 and the DC voltage can be generated after the EMI filter 510.

As with input interface 505, input interface 700 provides a square-wave signal on line 582 when power is applied across the common input COM and the second power input P2 and a square-wave signal on line 583 when power is applied across the common input COM and the third power input P3.

The constructions shown above are by way of example only. Connections and couplings described above can be via terminals, hard-wiring, cables, connectors, or other suitable connection schemes. It is also to be understood that the components of the system, i.e., the thermostat and system controller, can include analog or digital communications, and wired or wireless communication. The components of the system can also include programmable components and user interfaces. For example, a thermostat could determine a mode (e.g., speed, torque, airflow, etc.) to operate a motor in and the thermostat can provide one or more signals to a system controller or BLDC motor to select the mode. Additional devices and sensors can also be added to the system without compromising the invention. In addition, the BLDC motor can be used in any application expecting a multi-tapped induction motor. For example, the BLDC motor can be used in other applications/systems including gas-fired water heaters, boilers, electronic dryers, and garage door openers.

Thus, the invention provides, among other things, a BLDC motor assembly having a tapped winding interface. Various features and advantages of the invention are set forth in the following claims.

What is claimed is:
1. A brushless direct current motor, comprising:
a stator having windings configured to generate a plurality of magnetic fields;
a rotor having a plurality of magnets, the rotor rotatable by the plurality of magnetic fields; and
a drive circuit for driving the windings, the drive circuit including
a plurality of power inputs and a common input,
an input interface coupled to the plurality of power inputs and the common input and configured to receive an alternating current voltage across one of the plurality of power inputs and the common input and output the alternating current voltage, the input interface including a plurality of isolation devices configured to provide an indication based on the received alternating current voltage,
a filter and a rectifier configured to filter and rectify the alternating current voltage to a direct current voltage,
a controller configured to receive the direct current voltage from the rectifier and the indication from the input interface and to generate a control signal based on the indication, the indication identifying which of the plurality of power inputs the alternating current voltage is applied to, and means for powering the windings based on the control signal, the powering means including an inverter.

2. The brushless direct current motor of claim 1, wherein the rectifier is included in the input interface and the filter is separate from the input interface.

3. The brushless direct current motor of claim 1, wherein the alternating current voltage powers the brushless direct current motor and provides an indication of an operating parameter for operating the motor.

4. The brushless direct current motor of claim 3, wherein the controller operates the motor at the operating parameter based on the indication.

5. The brushless direct current motor of claim 3, wherein the operating parameter is a rotational speed.

6. The brushless direct current motor of claim 3, wherein the operating parameter is a motor torque.

7. The brushless direct current motor of claim 1, wherein each of the plurality of isolation devices include an opto-isolator to electrically isolate the controller from the alternating current voltage and convert the alternating current voltage into the indication.

8. The brushless direct current motor of claim 1, wherein the alternating current voltage is at least one of about 120 V AC and about 240 V AC.

9. A method of operating a permanent magnet, brushless direct current motor including a plurality of power inputs, a common input, a rectifier, an inverter, a controller, a plurality of isolation devices, a stator, and a rotor; the method comprising:

receiving an alternating current voltage across one of the plurality of power inputs and the common input;

creating an indication via the plurality of isolation devices, the indication indicating which of the plurality of power inputs is receiving the alternating current voltage;

rectifying the alternating current voltage;

powering the inverter with the rectified voltage;

providing the controller with the indication of;

driving the inverter based on the indication; and wherein only the inverter drives the stator to rotate the rotor.

10. The method of claim 9, further comprising connecting to a system controller, the system controller configured to operate a multi-tapped permanent split capacitor motor and providing the alternating current voltage to one of the plurality of power inputs.

11. The method of claim 9, further comprising determining, by an input interface, which of the plurality of power inputs the alternating current voltage is applied to.

12. The method of claim 11, wherein the plurality of isolation devices includes one or more opto-isolators.

* * * * *